United States Patent
Lee et al.

(10) Patent No.: US 9,165,713 B2
(45) Date of Patent: Oct. 20, 2015

(54) MULTILAYER CERAMIC ELECTRONIC COMPONENT AND BOARD FOR MOUNTING THE SAME

(71) Applicant: SAMSUNG ELECTRO-MECHANICS CO., LTD., Suwon, Gyunggi-do (KR)

(72) Inventors: Woo Joon Lee, Gyunggi-do (KR); Dae Bok Oh, Gyunggi-do (KR); Jae Yeol Choi, Gyunggi-do (KR); Wi Heon Kim, Gyunggi-do (KR); Sang Huk Kim, Gyunggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 166 days.

(21) Appl. No.: 13/946,934

(22) Filed: Jul. 19, 2013

(65) Prior Publication Data

US 2014/0311783 A1    Oct. 23, 2014

(30) Foreign Application Priority Data

Apr. 17, 2013  (KR) .................. 10-2013-0042452

(51) Int. Cl.
*H01G 4/06* (2006.01)
*H01G 4/005* (2006.01)
(Continued)

(52) U.S. Cl.
CPC .............. *H01G 4/005* (2013.01); *H01G 4/012* (2013.01); *H01G 4/12* (2013.01); *H01G 4/30* (2013.01)

(58) Field of Classification Search
USPC ................ 361/306.1, 306.3, 303–305, 301.1, 361/301.4, 321.1, 321.2
See application file for complete search history.

(56) References Cited

U.S. PATENT DOCUMENTS

| | | |
|---|---|---|
| 2005/0088803 A1 | 4/2005 | Umeda et al. |
| 2011/0157765 A1 | 6/2011 | Kim et al. |

(Continued)

FOREIGN PATENT DOCUMENTS

| | | |
|---|---|---|
| JP | 5-74644 A | 3/1993 |
| JP | 09-260184 A | 10/1997 |

(Continued)

OTHER PUBLICATIONS

Office Action issued on Jan. 28, 2014 in the corresponding Japanese Patent Application No. 2013-148236.

(Continued)

*Primary Examiner* — Nguyen T Ha
(74) *Attorney, Agent, or Firm* — McDermott Will & Emery LLP

(57) ABSTRACT

A multilayer ceramic electronic component includes a ceramic main body including dielectric layers and satisfying T/W>1.0 when W and T are width and thickness, respectively; and first and second internal electrodes stacked in the ceramic main body and facing each other with the dielectric layer interposed therebetween, the ceramic main body including an active layer corresponding to a capacitance forming portion contributing to capacitance formation and a cover layer corresponding to a non-capacitance forming portion provided on at least one of uppermost and lowermost surfaces of the active layer, and when the active layer is divided into three regions in a direction in which the first and second internal electrodes are stacked, an average width of internal electrodes in a central region of the three regions is Wa, and an average width of internal electrodes in upper and lower regions of the three regions is Wb, $0.920 \leq Wb/Wa \leq 0.998$ is satisfied.

13 Claims, 5 Drawing Sheets

(51) Int. Cl.
*H01G 4/30* (2006.01)
*H01G 4/012* (2006.01)
*H01G 4/12* (2006.01)

(56) References Cited

U.S. PATENT DOCUMENTS

2013/0027839 A1   1/2013   Kim
2014/0326494 A1*  11/2014  Chung et al. ............ 174/260

FOREIGN PATENT DOCUMENTS

| JP | 2005-129802 A | 5/2005 |
| JP | 2007-258279 A | 10/2007 |
| JP | 2010-067721 A | 3/2010 |
| JP | 2011-135032 A | 7/2011 |
| JP | 2013-30754 A  | 2/2013 |

OTHER PUBLICATIONS

Korean Office Action issued Korean Application No. 10-2013-0042452 dated Jun. 19, 2014, w/English translation.

Korean Office Action issued in Korean Application No. 10-2013-0042452 dated Feb. 23, 2015, with English Translation.

* cited by examiner

MULTILAYER CERAMIC ELECTRONIC COMPONENT AND BOARD FOR MOUNTING THE SAME

CROSS-REFERENCE TO RELATED APPLICATIONS

This application claims the priority of Korean Patent Application No. 10-2013-0042452 filed on Apr. 17, 2013, in the Korean Intellectual Property Office, the disclosure of which is incorporated herein by reference.

BACKGROUND OF THE INVENTION

1. Field of the Invention

The present invention relates to a multilayer ceramic capacitor and a circuit board structure for mounting the multilayer ceramic capacitor.

2. Description of the Related Art

In accordance with the recent trend for the miniaturization of electronic products, demand for small multilayer ceramic electronic components having a large amount of capacitance has increased.

Therefore, dielectric layers and internal electrodes have been reduced in thickness and stacked in increasingly large amounts through various methods. Recently, as the thickness of dielectric layers has been reduced, multilayer ceramic electronic components having increased amounts of stacked layers have been manufactured.

Multilayer ceramic electronic components may be miniaturized and dielectric layers and internal electrodes may be thinned, and thus, the amount of stacked layers may be increased in order to realize high capacitance in the multilayer ceramic electronic components.

The thicknesses of the dielectric layers and the internal electrodes are reduced and the amounts of stacked layers are increased to thereby realize high capacitance in the multilayer ceramic electronic components; however, in the case that an increase in the influence of step portions due to the increased amounts of stacked layers occurs, reliability may be degraded.

Particularly, there is a problem in which short circuit frequency increases near a cover layer due to a large amount of stress being exerted in the pressing of a ceramic main body, whereby reliability may be degraded.

There remains a need for a multilayer ceramic electronic component in which a decrease in the reliability thereof caused by the influence of step portions may not occur, while high capacitance is realized due to increased amounts of stacked layers.

RELATED ART DOCUMENT (Patent Document 1) Japanese Patent Laid-Open Publication No. 2005-129802

SUMMARY OF THE INVENTION

An aspect of the present invention provides a multilayer ceramic capacitor and a circuit board structure for mounting the multilayer ceramic capacitor.

According to an aspect of the present invention, there is provided a multilayer ceramic electronic component, including: a ceramic main body including dielectric layers and satisfying T/W>1.0 when W and T are width and thickness, respectively; and first and second internal electrodes stacked in the ceramic main body so as to face each other with the dielectric layer interposed therebetween, wherein the ceramic main body includes: an active layer corresponding to a capacitance forming portion contributing to capacitance formation; and a cover layer corresponding to a non-capacitance forming portion provided on at least one of uppermost and lowermost surfaces of the active layer, and when the active layer is divided into three regions in a direction in which the first and second internal electrodes are stacked, an average width of internal electrodes in a central region of the three regions is defined as Wa, and an average width of internal electrodes in upper and lower regions of the three regions is defined as Wb, $0.920 \leq Wb/Wa \leq 0.998$ is satisfied.

When an average thickness of dielectric layers in the central region is defined as Ta and an average thickness of dielectric layers in the upper and lower regions is defined as Tb, $1.01 \leq Tb/Ta \leq 1.15$ may be satisfied.

When an average thickness of the dielectric layer is defined as td, $0.1\ \mu m \leq td \leq 0.6\ \mu m$ may be satisfied.

The first and second internal electrodes may have a thickness of $0.6\ \mu m$ or less.

The first and second internal electrodes may be stacked in a thickness direction of the ceramic main body.

The first and second internal electrodes may be stacked in a width direction of the ceramic main body.

According to another aspect of the present invention, there is provided a multilayer ceramic electronic component, including: a ceramic main body including dielectric layers and satisfying T/W>1.0 when W and T are width and thickness, respectively; and first and second internal electrodes stacked in the ceramic main body so as to face each other with the dielectric layer interposed therebetween, wherein the ceramic main body includes: an active layer corresponding to a capacitance forming portion contributing to capacitance formation; and a cover layer corresponding to a non-capacitance forming portion provided on at least one of uppermost and lowermost surfaces of the active layer, and when the active layer is divided into three regions in a direction in which the first and second internal electrodes are stacked, an average thickness of dielectric layers in a central region of the three regions is defined as Ta, and an average thickness of dielectric layers in upper and lower regions of the three regions is defined as Tb, $1.01 \leq Tb/Ta \leq 1.15$ is satisfied.

When an average thickness of the dielectric layer is defined as td, $0.1\ \mu m \leq td \leq 0.6\ \mu m$ may be satisfied.

The first and second internal electrodes may have a thickness of $0.6\ \mu m$ or less.

The number of the stacked dielectric layers may be 500 or more.

The first and second internal electrodes may be stacked in a thickness direction of the ceramic main body.

The first and second internal electrodes may be stacked in a width direction of the ceramic main body.

According to another aspect of the present invention, there is provided a board for mounting a multilayer ceramic electronic component, including: a printed circuit board having first and second electrode pads provided on an upper surface thereof; and the multilayer ceramic electronic component as described above disposed on the printed circuit board.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
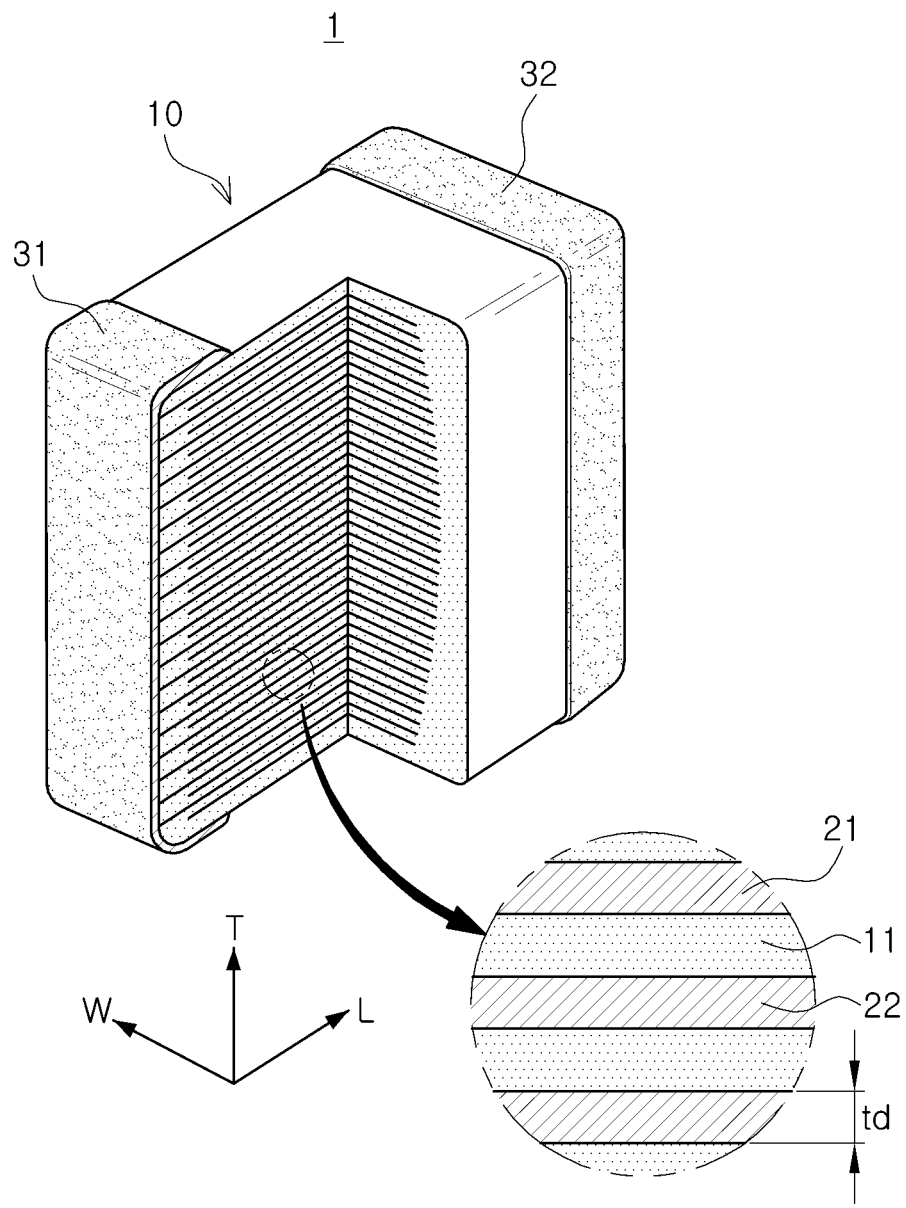
FIG. 1 is a partially cutaway perspective view of a multilayer ceramic capacitor according to an embodiment of the present invention.

Hereinafter, embodiments of the present invention will be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

FIG. 1 is a partially cutaway perspective view of a multilayer ceramic capacitor according to an embodiment of the present invention.

Figure 2:
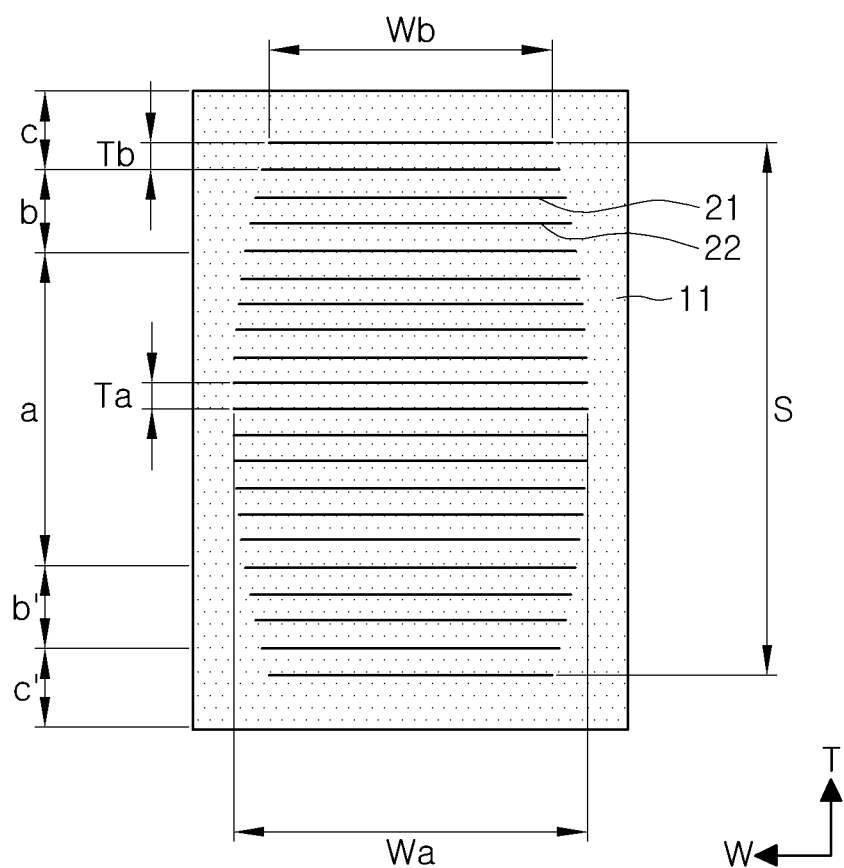
FIG. 2 is a cross-sectional view of the multilayer ceramic capacitor of FIG. 1, cut in a width direction thereof.

FIG. 2 is a cross-sectional view of the multilayer ceramic capacitor of FIG. 1, cut in a width direction thereof.

Referring to FIGS. 1 and 2, the multilayer ceramic electronic component according to an embodiment of the present invention includes a ceramic main body 10 including dielectric layers 11 and satisfying T/W>1.0 when W and T are width and thickness, respectively; and first and second internal electrodes 21 and 22 stacked in the ceramic main body 10 so as to face each other with the dielectric layer 11 interposed therebetween. The ceramic main body 10 includes an active layer S, a capacitance forming portion contributing to capacitance formation, and cover layers c and c', non-capacitance forming portions provided on at least one of uppermost and lowermost surfaces of the active layer S. When the active layer S is divided into three regions in a direction in which the first and second internal electrodes 21 and 22 are stacked, and an average width of internal electrodes in a central region a of the three regions is defined as Wa and an average width of internal electrodes in upper and lower regions b and b' of the three regions is defined as Wb, $0.920 \leq Wb/Wa \leq 0.998$ may be satisfied.

Hereinafter, a multilayer ceramic electronic component according to the embodiment of the invention will be described. Particularly, a multilayer ceramic capacitor will be described. However, the invention is not limited thereto.

A shape of the ceramic main body 10 is not particularly limited and, for example, the ceramic main body 10 may have a hexahedral shape.

Meanwhile, in the multilayer ceramic capacitor according to this embodiment, a 'length direction' refers to an 'L' direction of FIG. 1, a 'width direction' refers to a 'W' direction of FIG. 1, and a 'thickness direction' refers to a 'T' direction of FIG. 1. Here, the 'thickness direction' is the same as a direction in which the dielectric layers are stacked, that is, a 'stacking direction'.

The multilayer ceramic capacitor according to the embodiment of the invention may include the ceramic main body 10 including the dielectric layers 11 and satisfying T/W>1.0 when W and T are width and thickness, respectively; and the first and second internal electrodes 21 and 22 stacked in the ceramic main body 10 so as to face each other with the dielectric layer 11 interposed therebetween.

A material for the first and second internal electrodes 21 and 22 is not particularly limited, but may be a conductive paste made of at least one of, for example, noble metal materials such as palladium (Pd) and a palladium-silver (Pd—Ag) alloy, and the like, nickel (Ni) and copper (Cu).

The dielectric layer 11 may include a ceramic powder having a high dielectric rate, for example, a barium titanate-based ($BaTiO_3$) powder or a strontium titanate-based ($SrTiO_3$) powder, but the invention is not limited thereto.

On the other hand, the first and second internal electrodes 21 and 22, a pair of electrodes having opposing polarities, may be formed by printing a conductive paste containing a conductive metal on the dielectric layers 11 to have a predetermined thickness.

Furthermore, the first and second internal electrodes 21 and 22 may be alternately exposed through both end surfaces of the ceramic main body, and may be electrically insulated from each other through the dielectric layer 11 interposed therebetween.

In other words, the first and second internal electrodes 21 and 22 may be electrically connected to first and second external electrodes 31 and 32 by portions thereof alternately exposed through both end surfaces of the ceramic main body 10, respectively.

Therefore, when voltage is applied to the first and second external electrodes 31 and 32, charges are stored between the first and second internal electrodes 21 and 22 facing each other. At this time, capacitance of the multilayer ceramic capacitor 1 is proportional to an area of an overlap region of the first and second internal electrodes 21 and 22.

In order to form capacitance, the first and second external electrodes 31 and 32 may be formed in the outside of the ceramic main body 10 and may be electrically connected to the first and second internal electrodes 21 and 22.

The first and second external electrodes 31 and 32 may be formed of a conductive material the same as that of the internal electrodes, but the material for the first and second external electrodes 31 and 32 is not limited thereto. For example, the first and second external electrodes may be formed of copper (Cu), silver (Ag), nickel (Ni), or the like.

The first and second external electrodes 31 and 32 may be formed by adding a glass frit to a metal powder to prepare a conductive paste, applying the prepared conductive paste to outer surfaces of the ceramic main body 10, followed by sintering thereof.

The ceramic main body 10 is formed by stacking the plurality of dielectric layers 11, followed by sintering. A shape and dimensions of the ceramic main body 10 and the number of the stacked dielectric layers 11 included therein are not limited to those shown in the present embodiment.

Further, the plurality of dielectric layers 11 forming the ceramic main body 10 are in a sintered state such that boundaries between adjacent dielectric layers thereof may only be able to be discernable with the use of a Scanning Electron Microscope (SEM).

The ceramic main body 10 includes the active layer S, a capacitance forming portion contributing to capacitance formation, and the cover layers c and c', non-capacitance forming portions provided on at least one of the uppermost and lowermost surfaces of the active layer S.

The active layer S may be formed by repeatedly stacking the pair of the first and second internal electrodes 21 and 22 with each of the dielectric layers 11 interposed therebetween.

The upper and lower cover layers c and c' may be formed of the same material and have the same configuration as the dielectric layers 11, except that the upper and lower cover layers do not have internal electrodes.

The upper and lower cover layers c and c' may be formed by stacking one or two or more dielectric layers on the uppermost and lowermost surfaces of the active layer S in a vertical direction, respectively. The upper and lower cover layers c and c' generally serve to prevent the first and second internal electrodes 21 and 22 from being damaged by physical or chemical stress.

Meanwhile, T/W>1.0 may be satisfied when the width and the thickness of the ceramic main body 10 are defined as W and T, respectively.

The multilayer ceramic capacitor 1 according to the embodiment of the invention is formed to have an increased number of stacked layers therein for the realization of high capacitance, and the thickness T of the ceramic main body 10 may be greater than the width W thereof.

General multilayer ceramic capacitors, on the other hand, have been manufactured such that a width thereof is almost the same as a thickness thereof.

However, a size of the multilayer ceramic capacitor according to the embodiment of the invention may be decreased, and sufficient space may be secured when being mounted on a board, and therefore, the number of stacked layers may be increased in order to realize a high capacitance multilayer ceramic capacitor.

Since a stacking direction of the dielectric layers in the ceramic main body is a thickness direction, as the number of stacked layers may be increased, a relationship of thickness T and width W of the ceramic main body may satisfy T/W>1.0.

According to the embodiment of the invention, an average thickness td of the dielectric layer 11 may be changed arbitrarily, in accordance with a capacity design of the multilayer ceramic capacitor 1, but the average thickness of the dielectric layer after sintering may be 0.1 to 0.6 μm.

The average thickness td of the dielectric layer 11 may be measured on an image obtained by scanning an image of a cross-section of the ceramic main body 10 taken in the width direction as shown in FIG. 2 with a Scanning Electron Microscope (SEM).

For example, a random dielectric layer may be selected from an image of a cross-section of the ceramic main body 10 in the width-thickness direction W-T cut in a central portion of the ceramic main body 10 in the length L direction, scanned with a Scanning Electron Microscope (SEM), as shown in FIG. 2, and the thickness of the selected dielectric layer may be measured in 30 equidistant positions in the width direction, and then an average value of the measured thicknesses may be calculated.

The thickness of the dielectric layer in the 30 equidistant positions may be measured in the capacitance forming portion, the overlap region of the first and second internal electrodes 21 and 22.

Furthermore, when such a measurement of the average value is performed with respect to 10 or more dielectric layers, an average thickness of the dielectric layers can be further generalized.

According to the embodiment of the invention, when the active layer S is divided into three regions in the direction in which the first and second internal electrodes 21 and 22 are stacked and the average width of the internal electrodes in the central region a of the three regions is defined as Wa and the average width of the internal electrodes in the upper and lower regions b and b' of the three regions is defined as Wb, $0.920 \leq Wb/Wa \leq 0.998$ may be satisfied.

The multilayer ceramic capacitor 1 according to the embodiment of the invention has the increased number of stacked layers therein for the realization of high capacitance, such that the thickness T of the ceramic main body 10 is larger than the width W thereof, whereby the influence of step portions may occur as the number of stacked layers increases.

In particular, short circuits may frequently occur near the cover layer c and c' when a large amount of stress is exerted during pressing of the ceramic main body 10, and thus, reliability may be decreased.

In the embodiment of the invention, the average width Wa of the internal electrodes in the central region a and the average width Wb of the internal electrodes in the upper and lower regions b and b' are controlled to satisfy $0.920 \leq Wb/Wa \leq 0.998$, whereby the influence of the step portions caused by the increased number of stacked dielectric layers may be addressed and a high capacitance ceramic electronic component having a high degree of reliability may be realized.

In other words, the average width Wb of the internal electrodes in the upper and lower regions b and b' of the active layer, adjacent to the cover layers c and c' is controlled to be smaller than the average width Wa of the internal electrodes in the central region a, whereby a high capacitance multilayer ceramic electronic component having superior reliability may be realized.

When the ratio Wb/Wa of the width Wb of the internal electrodes in the upper and lower regions b and b' to the width Wa of the internal electrodes in the central region a is less than 0.920, a high capacitance multilayer ceramic capacitor may not be realized due to reduction in capacitance.

Meanwhile, when the ratio Wb/Wa of the width Wb of the internal electrodes in the upper and lower regions b and b' to the width Wa of the internal electrodes in the central region a is higher than 0.998, short circuits may occur and cause problems with reliability.

A thickness of the upper and lower regions b and b' is not particularly limited, and for example, may satisfy 1 to 20% with respect to the overall thickness of the active layer S in the direction in which the first and second internal electrodes 21 and 22 are stacked.

By allowing the thickness of the upper and lower regions b and b' to satisfy 1 to 20% with respect to the overall thickness of the active layer S, a high capacitance multilayer ceramic electronic component with superior reliability may be realized.

When the thickness of the upper and lower regions b and b' is less than 1% with respect to the overall thickness of the active layer S, a reliability improvement effect may not be obtained because the probability of the occurrence of short circuits may increase due to the influence of the step portions.

When the thickness of the upper and lower regions b and b' is greater than 20% with respect to the overall thickness of the active layer S, a high capacitance multilayer ceramic capacitor may not be realized due to capacitance being reduced by a decrease in the area of the overlap region between the internal electrodes.

According to the embodiment of the invention, in addition to the aforementioned feature, when an average thickness of dielectric layers in the central region a is defined as Ta, and an average thickness of dielectric layers in the upper and lower regions b and b' is defined as Tb, $1.01 \leq Tb/Ta \leq 1.15$ may be satisfied.

As described above, the average thickness Ta of the dielectric layers in the central region a and the average thickness Tb of the dielectric layers in the upper and lower regions b and b' are controlled to satisfy $1.01 \leq Tb/Ta \leq 1.15$, whereby a high capacitance multilayer ceramic capacitor having superior reliability may be realized.

In order words, the average thickness Tb of the dielectric layers in the upper and lower regions b and b' of the active layer, adjacent to the cover layers c and c', is controlled to be larger than the average thickness Ta of the dielectric layers in the central region a, and therefor, short circuits near the cover layers c and c' occurring when a large amount of stress is exerted upon the ceramic main body 10 during the pressing thereof may be prevented, and thus, reliability may be further improved.

When the ratio Tb/Ta of the average thickness Tb of the dielectric layers in the upper and lower regions b and b' to the average thickness Ta of the dielectric layers in the central region a is less than 1.01 or is higher than 1.15, a high capacitance multilayer ceramic capacitor having superior reliability cannot be realized.

An average thickness of the sintered first and second internal electrodes 21 and 22 is not particularly limited as long as they may form capacitance, and, for example, may be 0.6 μm or less.

The average thickness of the first and second internal electrodes 21 and 22 may be measured on the image obtained by scanning the cross-section of the ceramic main body 10 in the width direction with a Scanning Electron Microscope (SEM) as shown in FIG. 2.

For example, a random internal electrode may be selected from an image of a cross-section of the ceramic main body 10 in the width-thickness direction W-T cut in the central portion of the ceramic main body 10 in the length direction L scanned with the Scanning Electron Microscope (SEM), as shown in FIG. 2, and the thickness of the selected internal electrode may be measured in 30 equidistant positions in the width direction, and then an average value of the measured thicknesses may be calculated.

The thickness of the internal electrode in the 30 equidistant positions may be measured in the capacitance forming portion, the overlap region of the first and second internal electrodes 21 and 22.

Furthermore, when such measurement of the average value is performed with respect to 10 or more internal electrodes, an average thickness of the internal electrodes can be further generalized.

The multilayer ceramic electronic component according to another embodiment of the invention includes the ceramic main body 10 including the dielectric layers 11 and satisfying T/W>1.0 when W and T are width and thickness, respectively; and the first and second internal electrodes 21 and 22 stacked in the ceramic main body 10 so as to face each other with the dielectric layer 11 interposed therebetween. The ceramic main body 10 includes the active layer S, the capacitance forming portion contributing to capacitance formation, and the cover layers c and c', the non-capacitance forming portions provided on at least one of the uppermost and lowermost surfaces of the active layer S. When the active layer S is divided into three regions in the direction in which the first and second internal electrodes 21 and 22 are stacked, and the average thickness of the dielectric layers in the central region a of the three regions is defined as Ta and the average thickness of the dielectric layers in the upper and lower regions b and b' of the three regions is defined as Tb, $1.01 \leq Tb/Ta \leq 1.15$ is satisfied.

The number of stacked dielectric layers 11 is not particularly limited, and, for example, may be 500 or more.

By allowing the number of stacked dielectric layers 11 to be 500 or more, a high capacitance multilayer ceramic capacitor, in which the thickness T of the ceramic main body is greater than the width W thereof, may be realized.

Other features of the multilayer ceramic electronic component according to the present embodiment are the same as those of the multilayer ceramic electronic component according to the above-described embodiment, and descriptions thereof will not be unnecessarily repeated.

Figure 3:
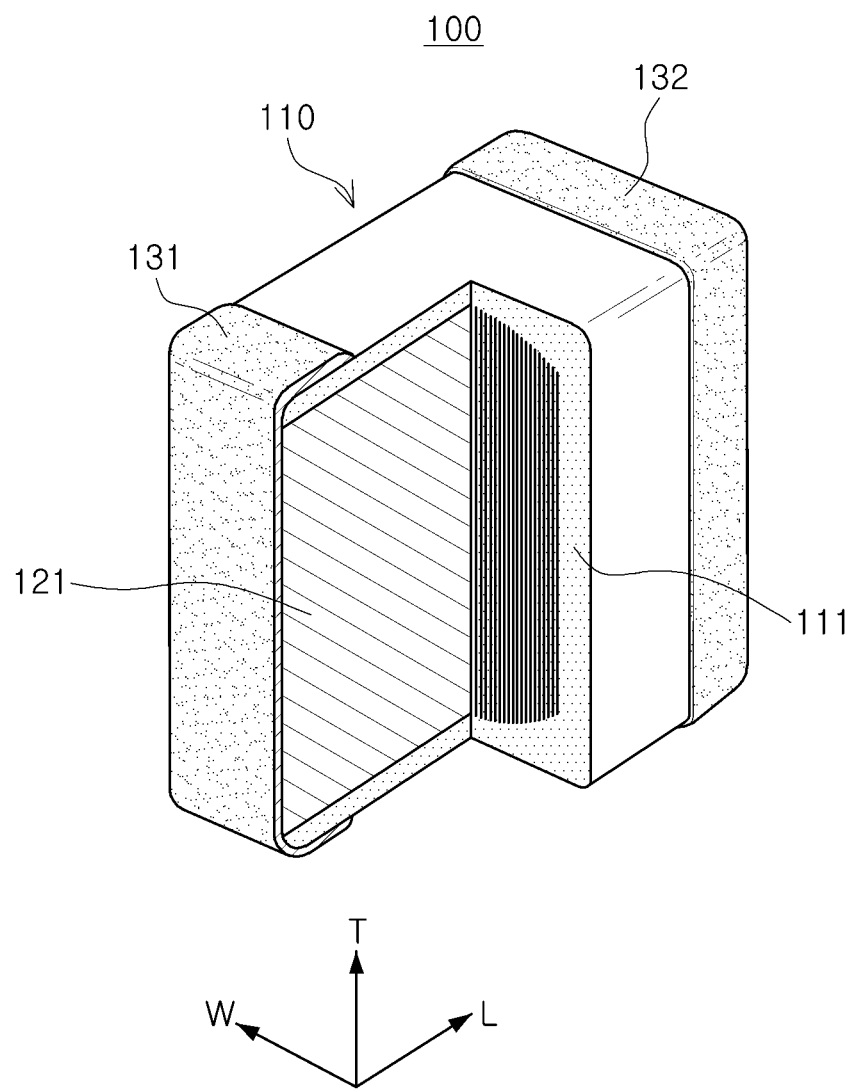
FIG. 3 is a partially cutaway perspective view of a multilayer ceramic capacitor according to another embodiment of the present invention.

FIG. 3 is a partially cutaway perspective view of a multilayer ceramic capacitor according to another embodiment of the invention.

Figure 4:
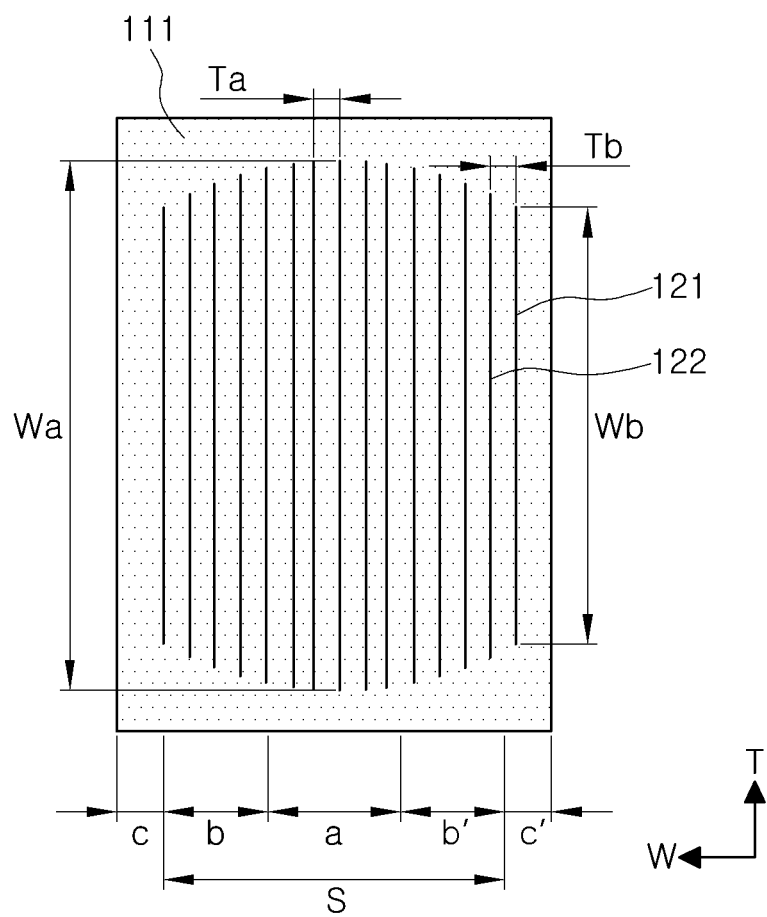
FIG. 4 is a cross-sectional view of the multilayer ceramic capacitor of FIG. 3, cut in a width direction thereof.

FIG. 4 is a cross-sectional view of the multilayer ceramic capacitor of FIG. 3 cut in a width direction.

Referring to FIGS. 3 and 4, a multilayer ceramic electronic component 100 according to this embodiment of the invention includes a ceramic main body 110 including dielectric layers 111 and satisfying T/W>1.0 when W and T are width and thickness, respectively; and first and second internal electrodes 121 and 122 stacked in the ceramic main body 110 so as to face each other with the dielectric layer 111 interposed therebetween. The ceramic main body 110 includes an active layer S, a capacitance forming portion contributing to capacitance formation, and cover layers c and c', non-capacitance forming portions provided on at least one of uppermost and lowermost surfaces of the active layer S. When the active layer S is divided into three regions in a stacking direction of the first and second internal electrodes 121 and 122, and an average width of internal electrodes in a central region a of the three regions is defined as Wa and an average width of internal electrodes in upper and lower regions b and b' of the three regions is defined as Wb, $0.920 \leq Wb/Wa \leq 0.998$ may be satisfied.

A multilayer ceramic electronic component according to another embodiment of the invention, particularly a multilayer ceramic capacitor will be described below; however, the invention is not limited thereto.

A shape of the ceramic main body 110 is not particularly limited and, for example, the ceramic main body 110 may have a hexahedral shape.

Meanwhile, in the multilayer ceramic capacitor 100 according to this embodiment, a 'length direction' refers to an 'L' direction of FIG. 3, a 'width direction' refers to a 'W' direction of FIG. 3, and a 'thickness direction' refers to a 'T' direction of FIG. 3. Here, the 'width direction' is the same as a direction in which the dielectric layers are stacked, that is, a 'stacking direction'.

As shown in FIGS. 3 and 4, the stacking direction of the multilayer ceramic capacitor 100 according to this embodiment of the invention is a width direction of the ceramic main body 110, unlike the multilayer ceramic capacitor 1 according to the above-described embodiment of the invention.

The multilayer ceramic capacitor 100 according to the present embodiment may be mounted in a perpendicular manner, in which the internal electrodes are disposed to be perpendicular to a board when mounted on the board.

Meanwhile, the multilayer ceramic electronic component according to another embodiment of the invention includes the ceramic main body 110 including the dielectric layers 111 and satisfying T/W>1.0 when W and T are width and thickness, respectively; and the first and second internal electrodes 121 and 122 stacked in the ceramic main body 110 so as to face each other with the dielectric layer 111 interposed therebetween. The ceramic main body 110 includes the active layer S, the capacitance forming portion contributing to capacitance formation, and the cover layers c and c', the non-capacitance forming portions provided on at least one of the uppermost and lowermost surfaces of the active layer S. When the active layer S is divided into three regions in the direction in which the first and second internal electrodes 121 and 122 are stacked, and an average thickness of the dielectric layers in the central region a of the three regions is defined as Ta and an average thickness of the dielectric layers in the upper and lower regions b and b' of the three regions is defined as Tb, 1.01≤Tb/Ta≤1.15 may be satisfied.

A stacking direction of the multilayer ceramic electronic component according to this embodiment of the invention is also a width direction of the ceramic main body 110, unlike the multilayer ceramic capacitor 1 according to the above-described embodiment of the invention.

The multilayer ceramic electronic component according to this embodiment of the invention may be mounted in a perpendicular manner in which the internal electrodes are disposed to be perpendicular to a board when mounted on the board.

Other features of the multilayer ceramic capacitor according to this embodiment of the invention are the same as those of the multilayer ceramic capacitor according to the above-described embodiment of the invention, and descriptions thereof will not be unnecessarily repeated.

Hereafter, although the invention will be described in detail with reference to the following Examples, it is not limited thereto.

These Examples were carried out with respect to a multilayer ceramic capacitor including dielectric layers 11 having an average thickness of 0.6 μm or less, and an active layer being divided into three regions in a direction in which first and second internal electrodes are stacked, in order to realize an improvement in reliability and capacitance in accordance with an average thickness of dielectric layers and an average width of internal electrodes in respective regions.

The multilayer ceramic capacitor according to Inventive Example was manufactured as follows.

First, slurry was formed to contain a powder such as a barium titanate (BaTiO$_3$) powder having an average particle size of 0.1 μm and was applied to a carrier film and dried, such that a plurality of ceramic green sheets having thicknesses of 1.05 μm and 0.95 μm, respectively, were prepared to form the dielectric layers 11.

Subsequently, a conductive paste for internal electrodes containing 40 to 50 parts by weight of nickel powder having an average particle size of 0.1 to 0.2 μm was prepared.

The conductive paste for internal electrodes was applied to the green sheets using a screen printing method to thereby form the internal electrodes, and 500 or more sheets were then stacked to form a multilayer body.

The multilayer body was pressed and cut to form a chip having a 0603-size standard (length×width) and satisfying a thickness/width ratio (T/W)>1.0, and the chip was sintered at a temperature of 1050 to 1200° C. under a reducing atmosphere in which H$_2$ was 0.1% or less.

Next, processes such as an external electrode formation process or a plating layer formation process, and the like, were performed to manufacture the multilayer ceramic capacitor.

The comparative Example was manufactured in the same manner as the method of the inventive Example, except that the average thickness of the dielectric layers and the average width of the internal electrodes in respective regions of the active layer were different from the numerical range defined in the inventive example.

The following Table 1 shows comparison results of high temperature accelerated aging and capacitance percentage (%) in accordance with the average thickness of the dielectric layers and the average width of the internal electrodes in respective regions of the active layer.

The high temperature accelerated aging test for reliability evaluation was carried out under conditions of 130° C. and 1.5 Vr, and the test results were represented as for a defect rate less than 5%, o for a defect rate of 5% to 10%, and X for a defect rate higher than 10%.

Furthermore, the capacitance percentage (%) means a ratio of an actual capacitance percentage to a target value. A capacitance percentage of 88% or more was evaluated as being satisfactory.

TABLE 1

| Sample No. | Wb/Wa | Tb/Ta | High Temperature Accelerated Aging | Capacitance Percentage (%) |
|---|---|---|---|---|
| *1 | 0.850 | 0.93 |  | 76 |
| *2 | 0.850 | 1.01 |  | 81 |
| *3 | 0.850 | 1.10 |  | 84 |
| *4 | 0.850 | 1.21 | o | 83 |
| *5 | 0.920 | 0.90 |  | 82 |
| 6 | 0.920 | 1.01 |  | 88 |
| 7 | 0.920 | 1.11 |  | 93 |
| *8 | 0.920 | 1.22 | x | 99 |
| *9 | 0.998 | 0.92 |  | 86 |
| 10 | 0.998 | 1.00 |  | 91 |
| 11 | 0.998 | 1.13 |  | 96 |
| *12 | 0.998 | 1.19 | x | 99 |
| *13 | 1.030 | 0.91 | o | 88 |
| *14 | 1.030 | 1.01 | x | 93 |
| *15 | 1.030 | 1.09 | x | 96 |
| *16 | 1.030 | 1.23 | x | 100 |

*Comparative Example

Referring to Table 1, it could be appreciated that sample Nos. 1 to 5, 8, 9 and 12 to 16 corresponding to the Comparative Examples resulted in a failure of reliability and capacitance formation because the ratio Wb/Wa of the average width Wb of the internal electrodes in the upper and lower regions b and b' of the active layer to the average width Wa of the internal electrodes in the central region a of the active layer, and the ratio Tb/Ta of the average thickness Tb of the dielectric layers in the upper and lower regions b and b' to the average thickness Ta of the dielectric layers in the central region a were outside of the numerical range described in the Inventive example.

Meanwhile, it could be appreciated that sample Nos. 6, 7, 10 and 11 satisfied the numerical range described in the Inventive Examples, and therefore, a high capacitance multilayer ceramic capacitor having superior reliability would be realized.

Board for Mounting Multilayer Ceramic Capacitor

Figure 5:
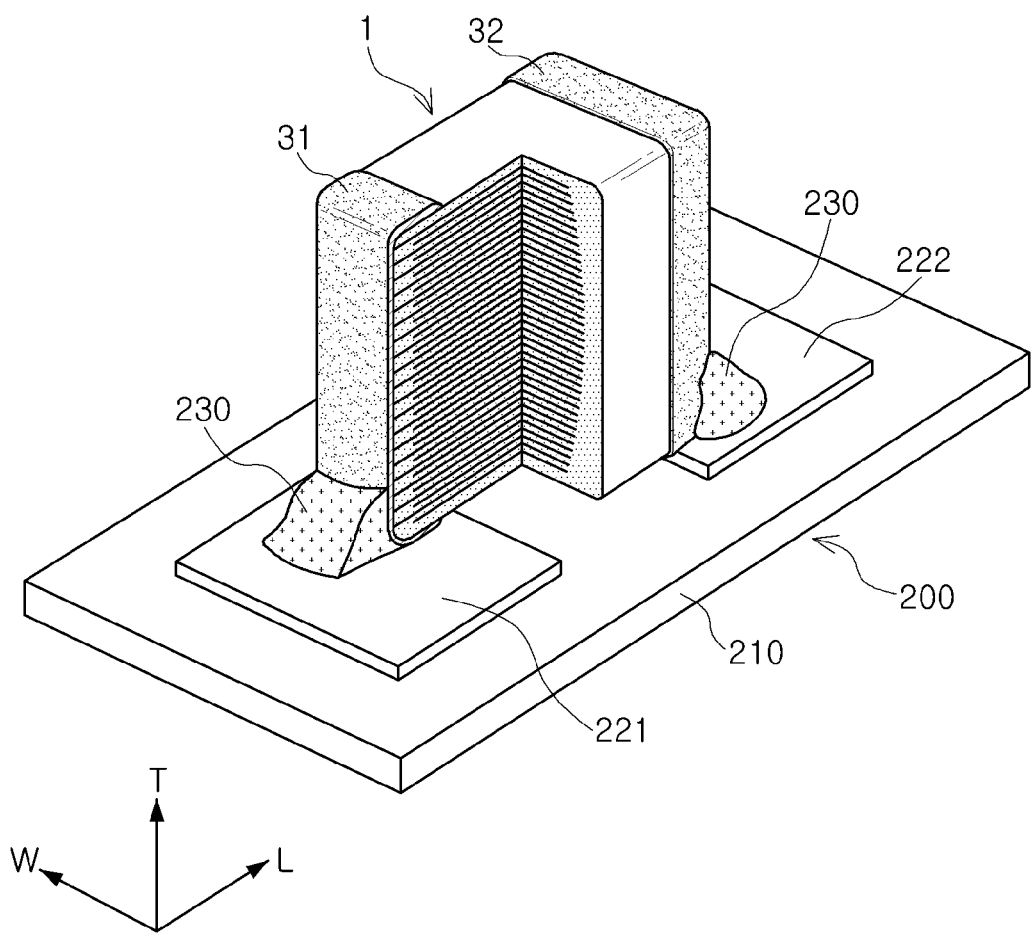
FIG. 5 is a partially cutaway perspective view showing the multilayer ceramic capacitor of FIG. 1 mounted on a printed circuit board.

FIG. 5 is a partially cutaway perspective view showing the multilayer ceramic capacitor of FIG. 1 mounted on a printed circuit board.

Referring to FIG. 5, a board 200 for mounting the multilayer ceramic capacitor 1 according to the present embodiment includes a printed circuit board 210 on which the multilayer ceramic capacitor 1 is mounted horizontally or vertically, and first and second electrode pads 221 and 222 disposed to be spaced apart from each other on the printed circuit board 210.

Here, the first and second external electrodes 31 and 32 of the multilayer ceramic capacitor 1 may be electrically connected to the printed circuit board 210 with a solder 230 while being brought into contact with the first and second electrode pads 221 and 222.

As set forth above, according to embodiments of the invention, a high capacitance multilayer ceramic electronic component having superior reliability may be realized.

Specifically, an average thickness of dielectric layers in upper and lower regions of an active layer, adjacent to upper and lower cover layers, may be increased and step portions may be decreased to thereby prevent short circuits, whereby the reliability of the multilayer ceramic electronic component may be improved.

In addition, an average thickness of dielectric layers in a central region of the active layer may be decreased, and an area of an overlap region between internal electrodes may be increased, whereby a large amount of capacitance may be achieved.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component, comprising:
    a ceramic main body including dielectric layers and satisfying T/W>1.0 when W and T are width and thickness, respectively; and
    first and second internal electrodes stacked in the ceramic main body so as to face each other with the dielectric layer interposed therebetween,
    wherein the ceramic main body includes:
    an active layer corresponding to a capacitance forming portion contributing to capacitance formation; and
    a cover layer corresponding to a non-capacitance forming portion provided on at least one of uppermost and lowermost surfaces of the active layer, and
    when the active layer is divided into three regions in a direction in which the first and second internal electrodes are stacked, an average width of internal electrodes in a central region of the three regions is defined as Wa, and an average width of internal electrodes in upper and lower regions of the three regions is defined as Wb, $0.920 \leq Wb/Wa \leq 0.998$ is satisfied.

2. The multilayer ceramic electronic component of claim 1, wherein when an average thickness of dielectric layers in the central region is defined as Ta and an average thickness of dielectric layers in the upper and lower regions is defined as Tb, $1.01 \leq Tb/Ta \leq 1.15$ is satisfied.

3. The multilayer ceramic electronic component of claim 1, wherein when an average thickness of the dielectric layer is defined as td, $0.1 \ \mu m \leq td \leq 0.6 \ \mu m$ is satisfied.

4. The multilayer ceramic electronic component of claim 1, wherein the first and second internal electrodes have a thickness of 0.6 μm or less.

5. The multilayer ceramic electronic component of claim 1, wherein the first and second internal electrodes are stacked in a thickness direction of the ceramic main body.

6. The multilayer ceramic electronic component of claim 1, wherein the first and second internal electrodes are stacked in a width direction of the ceramic main body.

7. A multilayer ceramic electronic component, comprising:
    a ceramic main body including dielectric layers and satisfying T/W>1.0 when W and T are width and thickness, respectively; and
    first and second internal electrodes stacked in the ceramic main body so as to face each other with the dielectric layer interposed therebetween,
    wherein the ceramic main body includes:
    an active layer corresponding to a capacitance forming portion contributing to capacitance formation; and
    a cover layer corresponding to a non-capacitance forming portion provided on at least one of uppermost and lowermost surfaces of the active layer, and
    when the active layer is divided into three regions in a direction in which the first and second internal electrodes are stacked, an average thickness of dielectric layers in a central region of the three regions is defined as Ta, and an average thickness of dielectric layers in upper and lower regions of the three regions is defined as Tb, $1.01 \leq Tb/Ta \leq 1.15$ is satisfied.

8. The multilayer ceramic electronic component of claim 7, wherein when an average thickness of the dielectric layer is defined as td, $0.1 \ \mu m \leq td \leq 0.6 \ \mu m$ is satisfied.

9. The multilayer ceramic electronic component of claim 7, wherein the first and second internal electrodes have a thickness of 0.6 μm or less.

10. The multilayer ceramic electronic component of claim 7, wherein the number of the stacked dielectric layers is 500 or more.

11. The multilayer ceramic electronic component of claim 7, wherein the first and second internal electrodes are stacked in a thickness direction of the ceramic main body.

12. The multilayer ceramic electronic component of claim 7, wherein the first and second internal electrodes are stacked in a width direction of the ceramic main body.

13. A board for mounting a multilayer ceramic electronic component, the board comprising:
    a printed circuit board having first and second electrode pads provided on an upper surface thereof; and
    the multilayer ceramic electronic component of any one of claims 1 to 12 disposed on the printed circuit board.

* * * * *